2 Sheets--Sheet 1.

A. C. CORSE.

Improvement in Base-Burning Stoves.

No. 4,421. Reissued June 13, 1871.

Witnesses.

C. H. Poole

John R. Young

Inventor.

Albert C. Corse, by Prindle & Dyer,

Attys.

AM. PHOTO-LITHOGRAPHIC CO. N.Y. (OSBORNE'S PROCESS.)

2 Sheets—Sheet 2.

A. C. CORSE.

Improvement in Base-Burning Stoves.

No. 4,421. Reissued June 13, 1871.

Witnesses.

C. H. Poole

John R. Young

Inventor.

Albert C. Corse, by Prindle and Dyer, Atty's.

AM. PHOTO-LITHOGRAPHIC CO. N.Y. (OSBORNE'S PROCESS.)

UNITED STATES PATENT OFFICE.

ALBERT C. CORSE, OF TROY, NEW YORK.

IMPROVEMENT IN BASE-BURNING STOVES.

Specification forming part of Letters Patent No. 107,597, dated September 20, 1870; reissue No. 4,421, dated June 13, 1871.

*To all whom it may concern:*

Be it known that I, ALBERT C. CORSE, of Troy, in the county of Rensselaer and State of New York, have invented certain new and useful Improvements in Base-Burning Coal-Stoves; and do hereby declare the following to be a full, clear, and exact description of the same, reference being had to the accompanying drawing making a part of this specification, in which—

Figure 1:
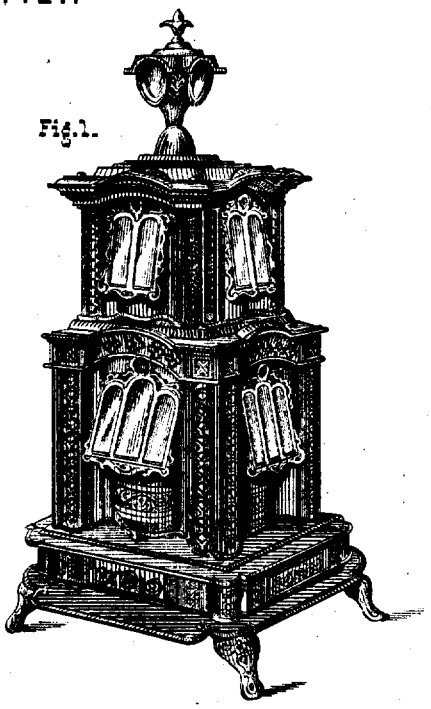
Figure 2:
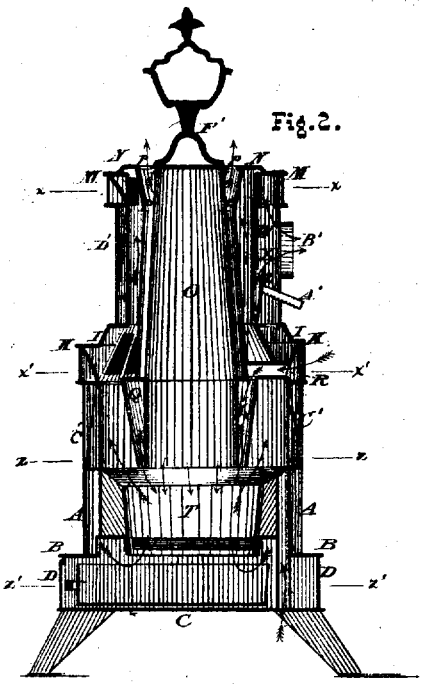
Figure 3:
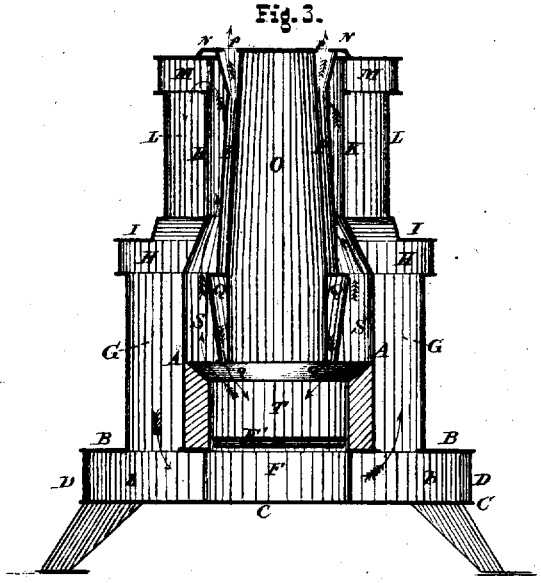
Figure 4:
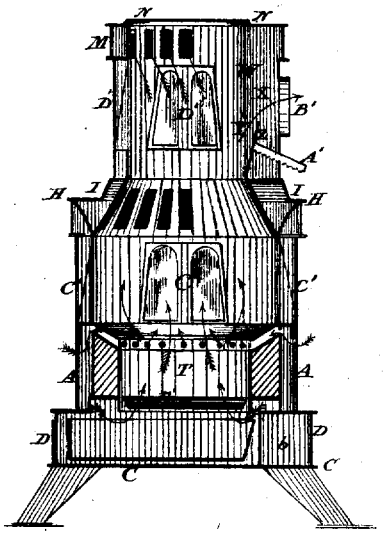
Figure 5:
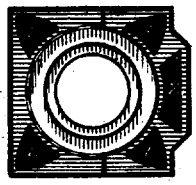
Figure 6:
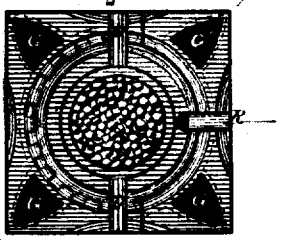
Figure 7:
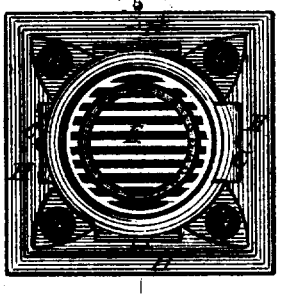
Figure 8:
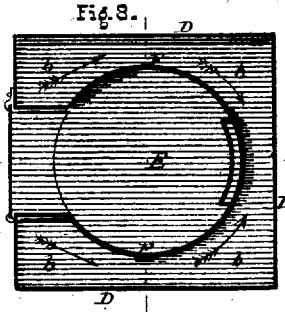
Figure 9:
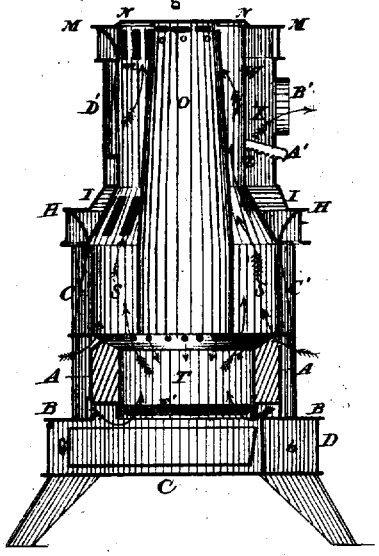
Figure 10:
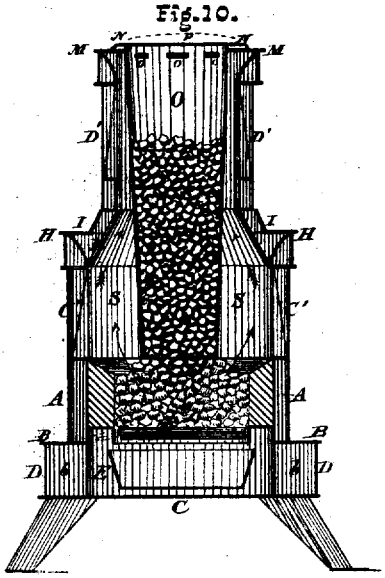

Figure 1 is a perspective view of my improved stove. Fig. 2 is a vertical central section of the same on the line passing from front to rear. Fig. 3 is a like view on a line passing diagonally through the corners of the stove. Fig. 4 is a vertical central section of the stove with the magazine removed so as to better show the interior arrangement of the same. Figs. 5, 6, 7, and 8 are horizontal sections of said stove on the line $x$, $x'$, $z$, and $z'$, respectively, of Figs. 1 and 2; and Figs. 9 and 10 are vertical central sections of the same, in which are shown modifications in the form of the magazine.

Letters of like name and kind refer to like parts in each of the figures.

My invention relates to a class of stoves having a magazine for supplying fuel to the fuel-chamber, and in which the heated escaping products of combustion are conveyed from said chamber through suitable downward or diving-flues into and through the base; and it consists, principally, in combining with the magazine an annular flue or chamber placed at its upper end and connected therewith, and with the flues in the base of the stove, substantially as and for the purpose hereinafter shown and described. It further consists in combining with the combustion-chamber, with said magazine and with the annular flue or chamber placed at or near its upper end, a second annular chamber placed above said combustion-chamber and connected therewith, with said upper annular chamber and with the flues in the base of the stove, substantially as and for the purpose hereinafter specified. It further consists in arching the annular or horizontal flues or chamber above the mica windows, substantially as and for the purpose hereinafter set forth. It further consists in sloping inward and downward the annular or horizontal flues or chambers immediately above the mica windows, substantially as shown, and for the purpose hereinafter described.

In the annexed drawing, A represents the lower section of the external casing of the stove, constructed in the form of a cylinder with its lower end secured to and resting upon a horizontal plate, B, forming the top of the base, which plate is provided with an opening that corresponds in shape and position with the interior of said cylinder. As seen in Fig. 1, the base has, vertically, a general rectangular form, and is composed of said top plate B, a corresponding bottom plate, C, and suitable vertical side plates D placed between the same, and the whole secured together in the usual manner. A suitable space, E, inclosed by vertical plates F at its sides and rear, but open at its front, is left within said base for the reception of an ash-drawer. Secured to and forming a part of the casing A, in a line radially with the corners of the base, are four flues, G, having a general triangular form transversely, the lower ends of which rest upon the top base-plate B, and by means of suitable openings through the same communicate with the space $b$ outside of the ash-pit, while their upper ends open into an annular chamber, H, that corresponds in exterior shape with said casing and flues, but is somewhat larger so as to project horizontally beyond the same. The upper side of said chamber is inclosed by means of a cover or top plate, I. Immediately above the section thus described is a second or upper section, K, somewhat less in diameter and height, but having the same general form, and provided with corner flues L similar in shape and position with those of said lower section, which flues open at their lower ends into the annular chamber H, while their upper ends open into a corresponding chamber, M, immediately beneath the top plate N. Suspended to or from the top plate N is a cylindrical magazine, O, constructed, preferably, double, so as to form an annular space, which is divided horizontally near its lower end so as to form an upper and a lower chamber or air-space, P and Q, respectively. The lower end of the magazine is provided with a series of small openings, $q$, which lead into the chamber Q, from whence communication with the exterior of the stove is had by means of a tube, R, that passes rearward through the section A, immediately below the chamber H, and permits air to pass freely inward and downward so as to be discharged into the combustion-chamber S immediately above the fire-pot T. Two tubes, U, extending from opposite sides of the magazine immediately above the lower end of the air-space V, outward through the annular chamber H, permit air to enter said space, from whence, after having become heated, said air passes outward through a series of openings, *v*, provided around the upper end of the magazine. The front corner flues being designed for the descending current of the heated escaping products of combustion, and those in the rear for the upward passage of the same to the exit-pipe, said flues are divided by means of a diaphragm, W, which is joined at its side edges to the casing K, immediately in front of the rear-corner flues L′, and at its upper end to the top plate N, while its lower end curves outward against and is secured to the lower section A immediately below the annular chamber H, by which means a semi-annular chamber, X, is formed between the magazine and rear casing of the stove, which chamber communicates with the fuel and combustion chambers through the rear flues G′, the side bottom flues *b*, and the front-corner flues G. In order that direct communication may be had, when desired, between the combustion-chamber and the chamber X, an opening, Y, having, preferably, a rectangular shape, is provided in and through the diaphragm W, near its lower end. A damper, Z, hinged at its lower end to said diaphragm, and operated by means of a handle, A′, passing outward through the casing, enables said opening to be closed at will. An exit-flue, B′, passing outward through the casing near the upper end of the chamber X, completes the system of flues, and enables the stove to be operated as is hereinafter described. Midway between the corner flues G, upon each side of the lower section, is placed a mica window or door, C′, its lower end being horizontal and situated immediately above the fuel-chamber, while its upper end is arched and extends upward to or near the flue H. In order that greater vertical dimensions may be given to these doors or windows the flue H is arched between the corner flues G, and is also inclined inward from its upper front corner, so as to afford no obstruction to a view of the interior of the stove. The frames of said mica doors, at their upper ends, rest against the casing, while at their lower ends they project outward so as to give the doors an inclination of about seventy degrees, by which means the capacity of the combustion-chamber is materially increased, and the mica lights are less liable to become soiled by the smoke or gas. In order to afford additional protection to said mica lights a series of openings, *c*′, is provided in and through the casing, immediately beneath each window, and serves for the admission of air to the combustion-chamber, which air, meeting the ascending current of gas, forces it inward and away from the windows. The sides and front of the upper section are provided with similar mica windows D′, to accommodate which the annular flue M is correspondingly arched and inclined inward between the corner flues.

Being provided with a suitable grate, E′, and a top cover, F′, the stove is ready for use, as follows: The damper Z being opened, and wood or other suitable fuel placed upon the grate and ignited, and coal supplied to the magazine, the smoke and gas given off from said wood will pass directly outward into and through the exit-pipe, creating a strong draft, so as to speedily ignite the coal, after which said damper may be closed, when the heated escaping products of combustion will be caused to pass down the front corner flues into the side bottom flues, and upward through the rear corner flues and the semi-annular chamber into the exit-pipe, having, in such passage, given off a large percentage of their heat.

The air passing inward and downward through the annular chamber in the lower end of the magazine meets and unites with the gas given off from the burning fuel, so as thereby to insure the combustion of said gas, while, by means of the upper annular chamber contained within the walls of said magazine, a continual current of air is heated and passed upward into the room, thereby increasing largely the heating capacity of the stove, and preventing the contents of said magazine from becoming overheated.

As more or less gas is generated within the magazine and liable to escape therefrom into the room, when the top cover is removed, it has been found advantageous to provide the upper end of said magazine with a series of openings, *o*, which pass outward through its walls and communicate with the space between the same and the upper end of the casing.

A number of openings, *m*, passing through said casing into the front portion of the chamber M, permit the escaping gas from said magazine, and also such as may have passed upward around the same from the combustion-chamber, to pass outward into the front corner flues, from whence it is drawn downward into and through the lower flues.

The modifications shown in Figs. 9 and 10, consisting in variations of the form of the magazine and in the omission of the surrounding annular chambers, are sufficiently illustrated to require no explanation.

Having thus fully set forth the nature and merits of my invention, what I claim as new is—

1. In combination with the magazine O provided with radial openings *o*, an annular or surrounding chamber, M, placed at the upper end of said magazine, and communicating, through suitable downward flues L and G, with the flues in the base of the stove, substantially as shown, and for the purpose described.

2. In combination with the magazine O, annular chamber M, and combustion-chamber S, the annular chamber H, placed immediately above and communicating with said combustion-chamber, and connected with said annular chamber M and with the base-flues by means of the vertical flues L and G, respectively, substantially as and for the purpose specified.

3. An annular or horizontal flue or chamber placed above mica windows, when the same is arched upward immediately above each window so as thereby to permit the vertical dimensions of the latter to be increased, substantially as shown and described.

4. An annular or horizontal flue or chamber placed above and projecting outward over mica windows, when the same is beveled or inclined inward and downward immediately above said windows, substantially as and for the purpose set forth.

In testimony whereof I have hereunto set my hand this 6th day of March, 1871.

A. C. CORSE.

Witnesses:
W. P. ALLENDORPH,
C. H. MCGRATH.